Oct. 7, 1941.    R. B. EVERSON    2,258,485
CONTROL VALVE
Filed Dec. 11, 1939
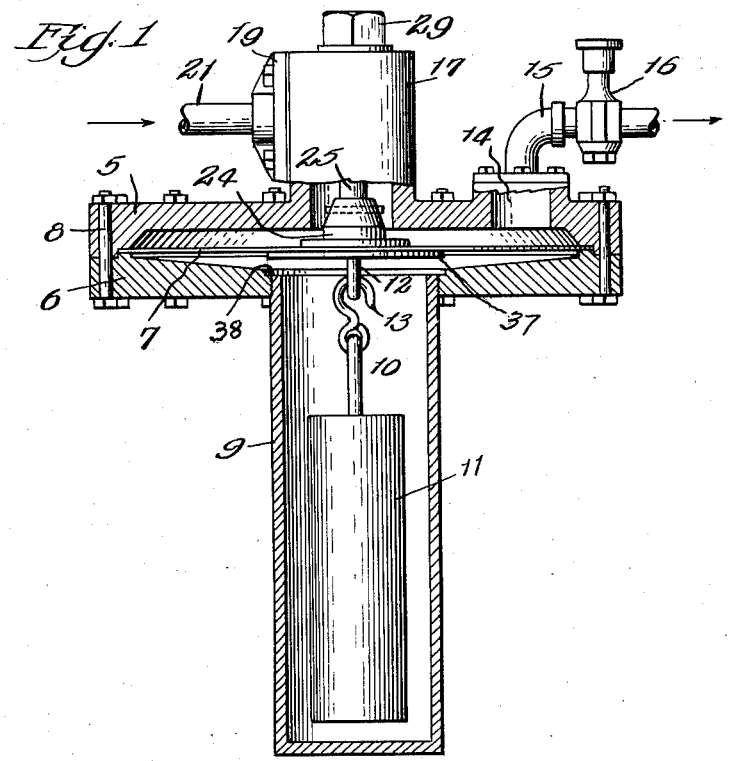
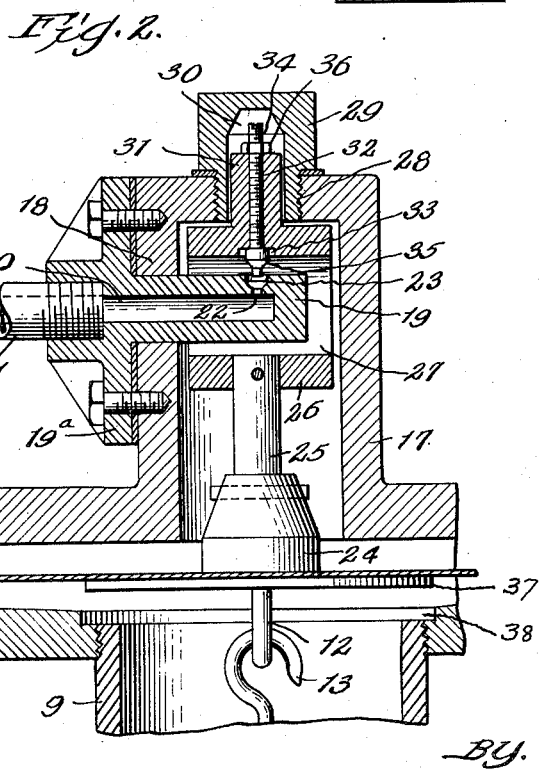
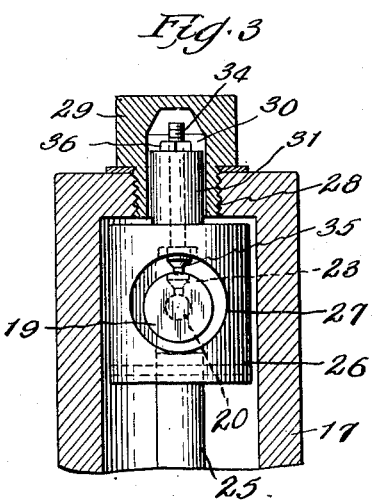
Inventor:
Roy B. Everson Patented Oct. 7, 1941

2,258,485

UNITED STATES PATENT OFFICE 2,258,485

CONTROL VALVE

Roy B. Everson, Chicago, Ill.

Application December 11, 1939, Serial No. 308,533

1 Claim. (Cl. 50—24)

My invention relates to valves for regulating and controlling the flow of a liquid or fluid and it has especial reference to a valve interposed in a conduit or pipe through which a fluid under pressure is permitted to flow when the valve is overbalanced under the influence of a vacuum created by a suction device.

A valve of this character is well-adapted for use in apparatus for the treatment and purification of water through the medium of chlorine in either a gaseous or liquid state. In connection with my present structure the chlorine is led to the valve under pressure and the valve is provided with means which overbalance this pressure to an extent sufficient to maintain the valve closed whenever the flow is stopped. A manually regulated conduit or pipe communicates with the valve and leads to a suction or vacuum creating device, and when this vacuum enters the valve chamber it counter-acts the influence of the pressure and the valve is unbalanced to permit flow of the fluid therethrough.

The means which I employ to balance the valve with relation to the pressure is actuated solely by gravity and it is in the form of a "dead-weight" mass so that at all times it exerts a positive, constant, and unvarying pull that is of utmost dependability. Weights of different sizes may be readily incorporated in the valve whenever the character of the service requires adjustment or change. The mass is suspended from or hangs free upon a diaphragm element that is operatively connected with and actuates the valve member for opening and closing the port communicating with the valve seat. By the use of a weight in the manner above suggested I am able to successfully overcome the inherent characteristic of springs, levers and mechanical movements to expand and contract under the influence of changes in temperature, and furthermore, I avoid the usual wear incident to connected moving parts, as well as erosion incident to atmospheric conditions.

The manner in which I connect the weight element or mass to the valve spindle is unique; the construction and disposition of the operative portions of my valve are devised to permit the quick assembly or disassembly thereof at all times; and the parts are arranged in a compact manner for economy of space. My valve is unusually dependable in operation; it contains no working parts that are liable to get out of order; and it is comparatively inexpensive to produce so that it may be sold for a reasonable retail price. I attain all these advantages and objects in substantially the manner hereinafter fully described and particularly pointed out in the appended claim. Reference is made to the accompanying drawing that forms a part hereof.

In the drawing:

Figure 1 is a view in elevation, partly broken away, showing my improved valve.

Figure 2 is a sectional view drawn to a larger scale.

Figure 3 is a view, partly in section, of the upper dome portion of the housing.

The drawing is more or less schematic and discloses a typical or preferred embodiment of my invention, and like reference characters are used in the different figures to identify the same parts wherever they appear.

The valve herein disclosed comprises a hollow body or housing consisting of superposed disk-shaped upper and lower members 5 and 6, the opposing faces of which are dished to provide an inner chamber, and said members are secured together by bolts 8 or the like. A flexible diaphragm 7 has its rim interposed and anchored between the members 5 and 6, thus dividing the chamber into upper and lower portions that do not communicate with each other. The lower member 6 of the housing has a central opening into which a hollow cylinder 9, having a closed outer end, is screwed in order to provide a well 10 in which the weight or mass 11 is disposed. A lug member 12 is secured to and depends from the underside of the diaphragm in a position to be above and in alinement with the weight 11 and said lug is provided with an aperture to removably receive a hook 13 carried by the upper end of the weight. This construction permits the well to be readily removed for the purpose of cleaning the same, or for changing the mass 11 should the service require modification.

The upper portion of the chamber inside the housing is provided with an outlet port 14 that communicates with a pipe or conduit 15 leading to a source of suction or vacuum creating means. The flow of liquid or gas through the conduit or pipe 15 is regulated by a hand operated valve 16. The central portion of the upper member 5 of the housing is formed with a dome 17 that extends a distance above the housing and is preferably cast integral with the top member 5, and its interior is a part of the upper portion of the chamber above the diaphragm 7. The cylindrical side wall of the dome is provided with a lateral opening or transverse bore 18 to receive a hollow stub 19 that enters the interior of the dome transversely and extends across the axis of the latter, and the bore 20 of this stub communicates at its outer end with a pipe or conduit 21 leading to a suitable source of pressure. In the present instance this source may be a tank of chlorine in either liquid or gaseous form and maintained under sufficient pressure to force its flow from the tank. The stub has an annular exterior flange 19a whereby it is secured against the outer face of the dome by screws or bolts to permit it to be readily removed when desired. At the inner end of the stub there is a transverse valve port 22 disposed transversely of the stub to provide a lateral continuation of the bore of the stub, and said port communicates at its upper end with a tapered valve seat 23 in the upper circumference of the stub. Thus it will be seen that liquid or gas under pressure entering the stub 19 through the pipe 21 discharges through the valve port 22 past the valve seat and into the dome 17, and flows from the dome down into the upper chamber of the housing from which it is discharged through the outlet 14.

The upper face of the diaphragm 7 has an embossment 24 secured to it from which arises an upright post 25 or the like, the post and the embossment being preferably disposed within portions of the dome and the chamber of the housing. Said post provides a foot or support for a yoke 26 that is located in the upper portion of the dome and which surrounds the inner portion of the stub 19. The yoke 26 is preferably a metal block of cylindrical shape so that its outer surface is concentric with the inner surface of the dome 17, and it is of a diameter that is slightly less than the inside of the dome. The yoke 26 is provided with a trans-axial bore 27 of a larger diameter than the diameter of the adjacent portion of stub 19 so there is sufficient clearance between this bore and the stub to permit the yoke to move up and down preferably without making contact with the stub.

The top wall of the dome is provided with a threaded, axial aperture 28 that is made in the top wall of the dome to receive the shank of a hollow cap-screw 29, and the hollow portion 30 of this cap-screw provides a guide for an extension 31 on the top of the yoke, permitting the structure to reciprocate whenever the yoke is moved up or down to open or close the valve. A screw-threaded bore 32 is made in this extension 31 and extends down through the yoke where its diameter is enlarged as at 33. The threaded spindle or shank 34 having a conical-shaped needle valve 35 on its lower end is screwed into the bore and may be secured in adjusted positions by a lock-nut 36. The needle valve alines with the valve seat and port in the inner end of stub 19 and it is actuated by fluctuations or movements of the diaphragm.

The weight 11 is a positive, gravity-operated, element and it is not affected by the changes of temperature nor is it subject to deterioration. It, therefore, provides a positive and constant balance which requires no attention or adjustment to accommodate it to atmospheric conditions. The mass 11 may be readily changed if desired, for another of different weight whenever the service requires. It will be understood the mass or weight 11 is sufficient to resist the pressure exerted on the diaphragm by the liquid or gas entering the chamber under pressure through the stub 19, so that, when the system is not in use, the mass pulls the yoke down and seats the needle valve to close the port 22. However, when the valve 16 is opened, the diaphragm is under the influence of the vacuum or suction in pipe 15 and said diaphragm rises and lifts the weight in proportion to the amount of pull exerted by the vacuum. This causes the yoke 26 to move upward, thus unseating the valve and permitting the gas or liquid to flow through the structure. The flow is regulated by the hand valve 16 so that it may be increased or diminished as needed. Immediately upon the closing of the hand valve 16 the vacuum or suction in the housing is stopped and the weight or mass 11 will overcome the pressure and will move the diaphragm downward to close the valve.

In the event the mechanism should fail to properly operate, as might occur if the valve 35 should fail to seat, pressure is liable to be built-up in the chamber above the diaphragm 7 and the dome 18. This accidental increased pressure would force the diaphragm down against the upper portion of the well, and if the pressure is great enough the thin metal of which diaphragms are usually made, would be liable to bulge into the well and become distorted or even ruptured. In order to prevent injury to the diaphragm, I secure a rigid plate 37 to the bottom surface of the diaphragm 7 in any suitable manner, and preferably form the apertured lug or ring 12 integral with this plate. As will be seen, the plate 37 is a wide disk of greater dimensions than the inside diameter of the well 9, and there is preferably a suitable shoulder or recess 38 in the lower member 6 of the housing extending around the margin of the opening into which the well is screwed. The plate 37 is relatively stiff so that should the diaphragm be accidentally forced down too far the plate will cover the opening and be seated on the shoulder or recess 38 and thus prevent the bulging or damaging of the diaphragm. As soon as pressure is relieved the diaphragm will move upwardly and unseat the plate 37 from the shoulder or recess 38.

What I claim is:

A valve structure embodying relatively flat dished members superposed upon each other to constitute a shallow chamber; a diaphragm extending across said chamber; a hollow dome projecting up from the top member and having free communication with the portion of said chamber above said diaphragm; an upstanding post extending into said dome from said diaphragm; a cylindrical element depending from the lower member and having free communication with said chamber below said diaphragm; an inlet-pipe extending transversely across said dome adapted to admit fluid thereto and to the upper portion of said diaphragm chamber; a valve-port in said pipe; a suction outlet-port leading from said chamber; a vacuum regulating conduit communicating with said outlet-port, whereby a fluid drawn through said dome and the upper portion of said chamber will tend to move said diaphragm upwardly towards said dome; a weight suspended from said diaphragm and disposed in said cylindrical element, said weight normally urging said diaphragm in a direction away from said dome; a yoke on said post extending about said inlet-pipe, and a needle-valve coacting with said valve-port for controlling the flow of fluid therethrough, said valve bodily supported upon said yoke, whereby to be actuated by said diaphragm.

ROY B. EVERSON.